United States Patent [19]
Shaw et al.

[11] Patent Number: 4,997,721
[45] Date of Patent: Mar. 5, 1991

[54] METHOD OF MAKING A BIRD REPELLANT STRUCTURE AND BLANK FOR USE THEREIN

[75] Inventors: Theodore W. Shaw; Jack B. Shaw, both of Johnstown, Pa.

[73] Assignee: Cat Claw, Inc., Johnstown, Pa.

[21] Appl. No.: 553,659

[22] Filed: Jul. 18, 1990

[51] Int. Cl.⁵ .......................... E04B 1/72; B21D 53/00
[52] U.S. Cl. .................................... 428/577; 428/596; 428/597; 72/335; 52/101
[58] Field of Search ............... 428/571, 572, 573, 574, 428/577, 582, 595, 596, 597, 603; 52/101; 256/2, 8, 11; 72/335, 326, 324

[56] References Cited

U.S. PATENT DOCUMENTS

| | | | |
|---|---|---|---|
| 386,742 | 7/1888 | Grellner | 256/8 |
| 478,170 | 7/1892 | Perkins | 256/8 |
| 2,018,085 | 10/1935 | Otte | 428/603 |
| 2,306,080 | 12/1942 | Peles | 52/101 |
| 3,407,550 | 10/1968 | Shaw | 52/101 |
| 3,417,651 | 12/1968 | Moehlenpah | 428/575 |
| 3,473,362 | 10/1969 | Black et al. | 72/326 |
| 3,615,273 | 10/1971 | See | 428/596 |
| 4,165,672 | 8/1979 | Jureit et al. | 72/326 |
| 4,328,955 | 5/1982 | Hermans | 256/8 |
| 4,404,778 | 9/1983 | Ushimaru | 52/101 |
| 4,844,422 | 7/1989 | Major | 256/8 |

FOREIGN PATENT DOCUMENTS

| | | | |
|---|---|---|---|
| 1220458 | 4/1959 | France | 428/597 |
| 2182690A | 5/1987 | United Kingdom | 256/2 |

*Primary Examiner*—John J. Zimmerman
*Attorney, Agent, or Firm*—Fidelman & Wolffe

[57] ABSTRACT

An improved blank base and method of making a bird repellant structure. The method comprises forming slots into a continuous base strip for the formation of repellant members. Said repellant members have a single forward diagonal edge for the simple cutting of repellant barbs.

12 Claims, 2 Drawing Sheets

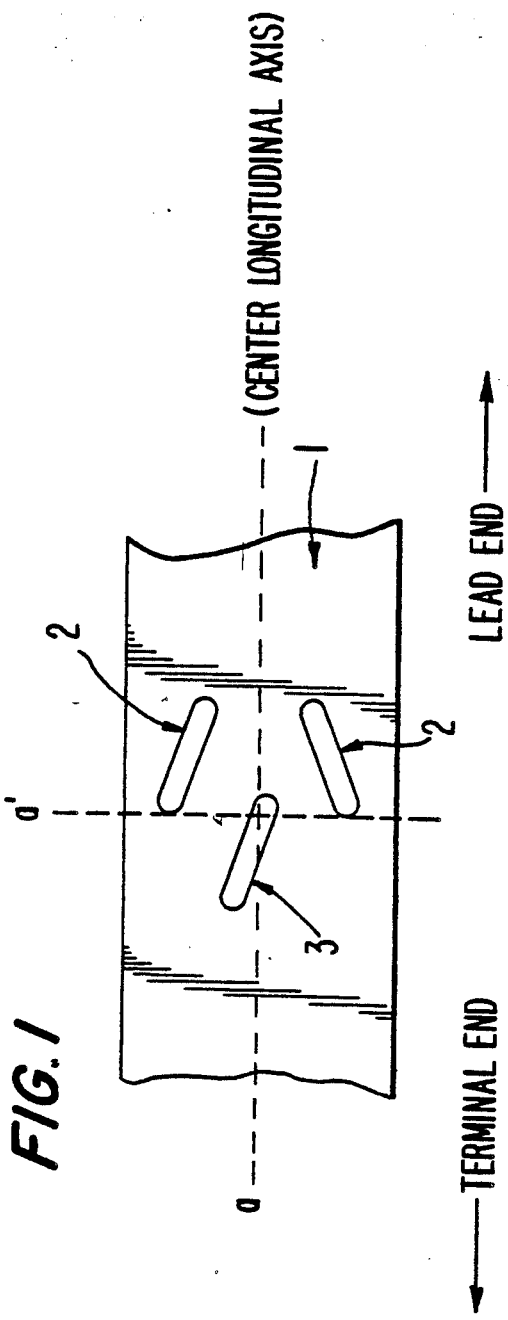
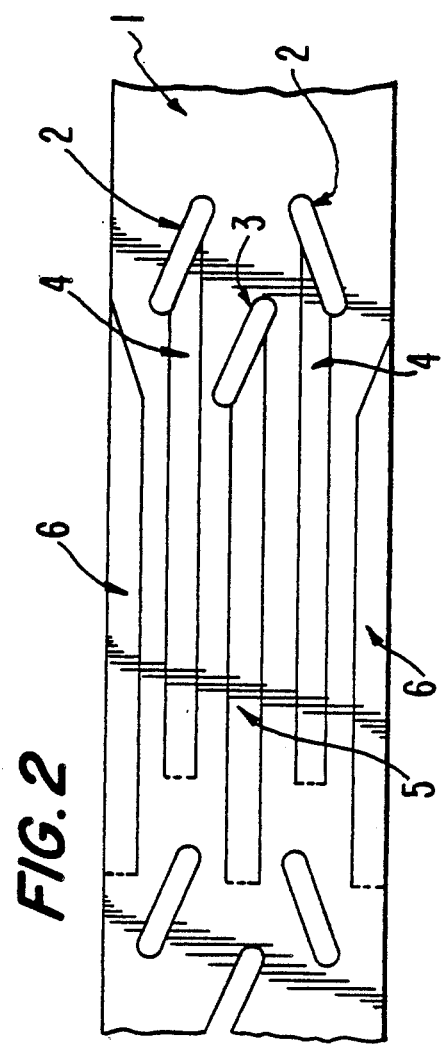

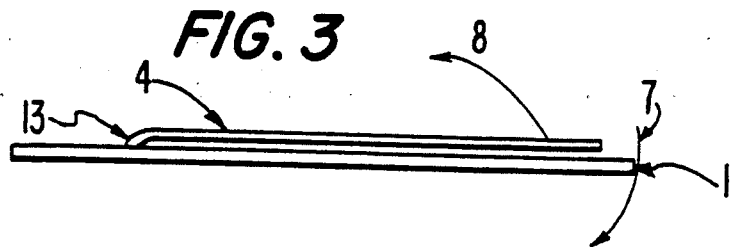
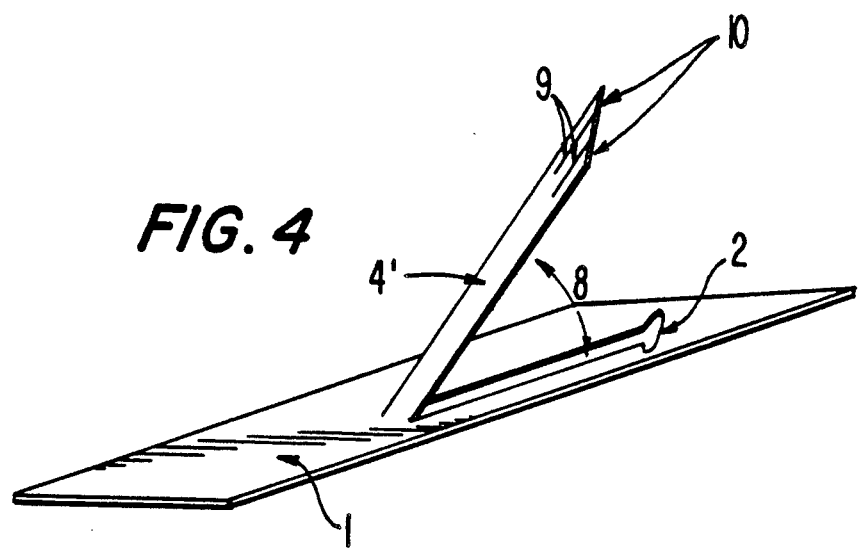
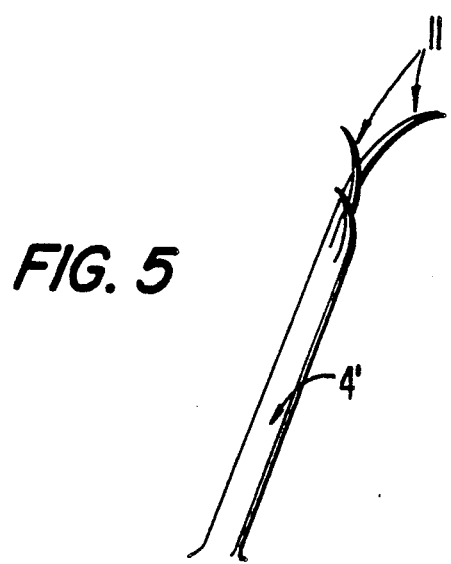

METHOD OF MAKING A BIRD REPELLANT STRUCTURE AND BLANK FOR USE THEREIN

BACKGROUND OF THE INVENTION

The problem of bird proofing buildings has produced through the years a myriad of diverse proposals. These have included electrical sound systems for the emanation of either bird distress calls or natural bird enemy calls as well as numerous mechanical solutions. Representative of several mechanical devices are Peles U.S. Pat. Nos. 2,306,080, 2,475,047 and 2,938,243; Burnside U.S. Pat. No. 2,777,171; Kaufmann U.S. Pat. No. 2,888,716; Pavloff U.S. Pat. No. 2,308,893; Shaw U.S. Pat. No. 3,282,000 and Shaw U.S. Pat. No. 3,407,550, the instant method providing a novel and improved starting material and method of making the structure of the later patent. The bird repellent structure of U.S. Pat. No. 3,407,550 to Shaw et al. has proven to be extremely effective and commercially successful as a structure marketed as Cat Claw ®. The previous method of making the device, however, has proven to be problematic and inefficient due to the nature of the blank starting material from which it was made.

It is therefore a object of the instant invention to provide a novel blank starting material for the production of the Cat Claw ® structure.

It is still a further object of the instant invention to provide a novel method for the production of the Cat Claw ® structure.

SUMMARY OF THE INVENTION

The instant invention relates to a novel method of making the bird repellent structure of U.S. Pat. No. 3,407,550. The instant method provides a simple way to form repellent arms and repellent fingers from a continuous base strip to yield the final bird repellent structure using conventional metal cutting techniques. This object of the invention is accomplished by providing novel diagonal slots in the continuous base strip from which the repellent arms and fingers are to be formed.

The invention also relates to a novel blank base starting material for use in the instant method of manufacture which comprises diagonal slots disposed therein. The instant method of manufacture may therefore comprise the production of the novel starting material through to the final product or, may comprise the production of the final product from stock blank base starting material which has been stored from earlier production. This makes possible the easy shipment of said starting material for the simple production of the final product at various locations.

In the former case the method starts with a continuous uncut metal base strip. A plurality of novel diagonal slots are cut into the base strip which facilitate the bending of repellent arms and forming of repellent fingers on said arms. Once the slots are formed into the base strip, a plurality of longitudinally disposed strips are punched into the strip which will ultimately form the repellent arms and fingers. By bending the longitudinal strips away from the continuous base strip and making short cuts longitudinally from the end of each strip to form fingers, the strips become repellent arms. When the fingers are spread to form barbs on the ends of the repellent arms, the structure is ready for use as a bird repellent.

Alternatively, after cutting the diagonal slots and longitudinal strips the continuous base strip may be rolled into a coil and shipped to other locations for the final cutting or erection. These and other objects of the invention will become apparent from the following drawings and description.

BRIEF DESCRIPTION OF THE DRAWINGS

The preferred embodiments of the invention are described with the aid of the following drawings which are considered to be non-limiting:

FIG. 1: A fragmentary stylized view of a embodiment of the invention.

FIG. 2: A fragmentary stylized view of further embodiments of the invention.

FIG. 3: A fragmentary stylized view of the invention indicating a functional aspect of the method.

FIG. 4: A fragmentary perspective view of a further embodiment of the invention.

FIG. 5: A fragmentary perspective view of an advantage of the invention.

DETAILED DESCRIPTION OF THE INVENTION

The method of the instant invention comprises first punching two apposing diagonal slots (2) into a continuous base strip (1) substantially equidistant from the center longitudinal axis (a) thereof. The base strip (1) is preferably steel and more preferably stainless steel. Still more preferably the base strip (1) is 18 gauge 18-8 stainless steel with a width of 1.5 inches.

Following the forming of diagonal slots (2), a third diagonal slot (3) is punched into the base strip (1) substantially along the center longitudinal axis (a) thereof. The diagonal slots (2) and (3) are preferably all of substantially the same dimension. Still more preferably the slots are about are ⅜ inches in length. Additionally, the diagonal slots are preferably at an angle of about twenty degrees from the center longitudinal axis (a) of base strip (1). The third diagonal slot (3) is preferably disposed between slots (2) such that the lead end of said slot rests about on the lateral line (a') between the terminal ends of slots (2).

Once the diagonal slots (2) and (3) are formed in the continuous base strip (1), two longitudinally disposed cut-out strips (4) are formed in said base strip. The cut-out strips (4) are disposed substantially equidistant from axis (a) such that edge formed by punching slots (2) forms the lead edge of said cut-out strip. The lead end of the cut-out strips (4) therefore constitute a single diagonal edge which makes possible the advantageous object of the instant method.

By having a single diagonal edge, the formation of fingers (10) becomes significantly simpler and more efficient than in the prior art. The cut (9) which forms fingers (10) may be made in a single longitudinal motion. In the prior art the lead edge of the cut-out strips was a two sided point which required diagonal cuts to form fingers therein. Such cuts were difficult to make and the limited accuracy of such cuts combined with the additional time required to make them made the prior art method difficult and inefficient.

Next, a center cut-out strip (5) or a center cut-out strip (3) and side cut-out strips (6) are formed into the base strip (1). The center strip (5) is disposed substantially on the axis (a) so that, analogously to strips (4), the lead edge constitutes the edge formed by the cutting of slot (3). The lead edges of side cut-out strips (6) are similarly diagonal edges which edges are substantially parallel to one or another of said slots. Cut-out strips (5) and (6) are disposed on the base strip (1) such that the lead ends thereof begin about on the lateral line (a') between the terminal ends of slots (2).

The terminal ends of all the cut-out strips remain attached to the base strip (1) and are slightly raised therefrom by bend (13) which is formed due to the punching of said slots. Further, all of said strips are substantially parallel. Similarly, all of said cut-out strips or of substantially the same dimension. Preferably the cut-out strips are about three inches in length and about ¼ in width.

The cut-out strips may then be physically bent away from base (1) in motion (8) or caused to bend away from base (1) by flexing said base in motion (7). Once bent away from base (1) the cut-out strips become repellent arms, for example (4'). Two longitudinal cuts (9) may then be formed in the cut-out strips to form fingers (10). As noted above, the longitudinal cuts (9) are made with advantageous ease and efficiency due to the single diagonal lead edges of the cut-out strips. The single diagonal edge makes possible the simultaneous formation of both longitudinal cuts whereas prior to the instant invention the cuts were made one at a time. The fingers are then separated by spreading or twisting to form barbs (11). Another advantageous aspect of the invention is that the spreading may be accomplished as part of the cutting motion of the longitudinal cuts (9) because the cuts may now be made parallel and simultaneously. This is accomplished by spreading the fingers (10) in a longitudinal manner during cutting to form barbs (11) in a fan pattern. The process may then be repeated indefinitely along the continuous base (1). Preferably there are 28 sets of slots and cut-out strips in eight feet of base strip (1).

The method of manufacture may be accomplished by conventional metal cutting techniques. Preferably the base strip (1) is passed through a double set of cutter rollers, the first set cutting the slots and cut-out strips and the second set making cut(s) (9) to form fingers (10). The base strip (1) may then be passed over appropriate push rods to bend the cut-out strips from the base in motion (8) or, may be flexed in motion (7) by an appropriate flexing means to cause the cut-out strips to bend away in motion (8). The fingers (10) are then divided or twisted by an appropriate spreading means to form barbs.

Alternatively, the base strip (1) with slots (2) and (3) or the base strip (1) with slots (2), (3), and cut-out strips (4), (5) and (6) may be rolled into a coil for storage as a novel blank base. The blank base may then be shipped to other locations or used as the starting material to complete the manufacture of the bird repellent structure. Furthermore, all of the automatic operations noted above with the exception of the cutting may be easily performed by hand.

While particular embodiments of the invention have been shown, it will be understood, of course, that the invention is not limited thereto. The appended claims are intended to cover any such modifications as would be apparent to one skilled in the art which fall within the true scope and spirit of the invention.

We claim:
1. A blank base for the manufacture of a bird repellent structure said blank comprising:
   a continuous base strip with a plurality of cut-out strips disposed longitudinally along said base strip and formed integrally therefrom, the lead end of said cut-out strips being free from said base strip and the terminal ends of said cut-out strips remaining attached to said base strip;
   said cut-out strips being substantially parallel to each other in groups of three or five disposed along said base strip, said groups comprising said cut-out strips longitudinally staggered across said base strip;
   diagonal slots disposed in said base strip, said slots corresponding to the lead ends of the three cut-out strips in each of said groups cut from the center portion of said base strip, said lead ends comprising a single diagonal edge corresponding to the diagonal of said slots, said diagonal edges of said lead ends being formed by the cutting of said slots in said center portion of said base strip.

2. The blank as claimed in claim 1 which is made of stainless steel.

3. The blank as claimed in claim 1 wherein the number of said cut-out strips in each of said groups is five.

4. A method of manufacturing a bird repellent structure from a blank base comprising:
   a continuous base strip with a plurality of cut-out strips disposed longitudinally along said base strip and formed integrally therefrom, the lead end of said cut-out strips being free from said base strip and the terminal ends of said cut-out strips remaining attached to said base strip;
   said cut-out strips being substantially parallel to each other in groups of three or five disposed along said base strip, said groups comprising said cut-out strips longitudinally staggered across said base strip;
   diagonal slots disposed in said base strip, said slots corresponding to the lead ends of the three cut-out strips in each of said groups cut from the center portion of said base strip, said lead ends comprising a single diagonal edge corresponding to the diagonal of said slots, said diagonal edges of said lead ends being formed by the cutting of said slots in said center portion of said base strip;
   said method comprising:
   bending said cut-out strips away from said base strip to form repellent arms;
   making two substantially straight longitudinal cuts along said repellent arms to form sharp fingers at the lead ends of said repellent arms;
   dividing said fingers by spreading or twisting to form repellent barbs.

5. The method of claim 4 wherein the bending away of said cut-out strips comprises flexing said base strip with a flexing means to cause said cut-out strips to move substantially away from the plane of said base strip.

6. The method of claim 4 wherein said fingers are spread during the forming of said longitudinal cuts.

7. A method of manufacturing a bird repellent structure comprising:
   first, punching into a continuous base strip two apposing diagonal slots of substantially the same dimension, said slots being disposed substantially equidistant from the center longitudinal axis of said base strip;
   second, punching into said continuous base strip a third diagonal slot of substantially the same dimension as said apposing diagonal slots and substantially on the center longitudinal axis of said base strip, said slot being parallel to one or the other of said opposing diagonal slots and being disposed between said slots such that the lead end of said third slot rests about on the lateral line between the terminal ends of said apposing diagonal slots;

third, punching two first longitudinally disposed cut-out strips into said continuous base strip, said first cut-out strips being disposed substantially equidistant from the center longitudinal axis of said continuous base strip, such that the edge formed by the punching out of said apposing diagonal slots forms the lead edge of said cut-out strips and said cut-out strips terminate at a point where said cut-out strips are integrally attached to said continuous base strip;

fourth, punching one center or one center and two side longitudinally disposed cut-out strips of substantially the same dimension as said two first cut-out strips into said continuous base strip, said center cut-out strip being substantially located on the center longitudinal axis of said continuous base strip such that the edge formed by the punching out of said third diagonal slot forms the lead edge of said center cut-out strip and said strip terminates at a point where said strip is integrally attached to said continuous base strip, said side cut-out strips beginning and terminating about on the same lateral line as said center cut-out strip, the outer edges of said side cut-out strips being formed of the outer longitudinal edges of said continuous base strip and the leading edges of said side cut-out strips being a diagonal cut substantially parallel to one or another of said diagonal slots, and said strips terminating in the same manner as said center cut-out strip;

fifth, flexing said continuous base strip such that said cut-out strips bend away from the plane of said base strip to form repellent arms, and forming two longitudinal cuts from the lead edges of said arms to form fingers;

sixth, fully dividing said fingers and spreading or twisting said fingers to form said fingers into barbs; said steps one through six being indefinitely repeated to form repeating sets of three or five cut-out strips along said continuous base strip.

8. The method of claim 7 wherein said diagonal slots are at an angle substantially twenty degrees from the center longitudinal axis of said continuous base strip.

9. The method of claim 7 wherein said cut-out strips are about three inches in length and about ¼ inch in width.

10. The method of claim 7 wherein said fingers are spread during the formation of said longitudinal cuts.

11. The method of claim 7 wherein said continuous base strip is stainless steel.

12. The method of claim 7 wherein the longitudinal distance between the lead ends of each set of said apposing diagonal slots along said continuous base strip is about 3.5 inches.

* * * * *